United States Patent [19]

Flanner et al.

[11] Patent Number: 4,538,203

[45] Date of Patent: Aug. 27, 1985

[54] PASSIVE MASS-SPRING TYPE OF SENSING DEVICE HAVING ELECTRONIC DAMPING

[75] Inventors: Philip D. Flanner, Pleasant Hill; Harold D. Morris, Orinda; Gerald R. Newell, Concord, all of Calif.

[73] Assignee: Systron Donner Corp., Concord, Calif.

[21] Appl. No.: 483,584

[22] Filed: Apr. 11, 1983

[51] Int. Cl.³ ............................................. H01H 47/00
[52] U.S. Cl. ..................................... 361/159; 367/182; 367/190; 73/654
[58] Field of Search ............... 361/139, 147, 160, 159; 73/652, 654, 526, 497; 367/190, 187, 185, 183, 182

[56] References Cited

U.S. PATENT DOCUMENTS

| | | | |
|---|---|---|---|
| 2,562,983 | 8/1951 | Clewell | 367/182 |
| 3,453,573 | 7/1969 | Kyle | 73/497 |
| 3,633,053 | 1/1972 | Peters | 73/654 X |
| 4,051,718 | 10/1977 | Meckl et al. | 367/182 X |
| 4,144,764 | 3/1979 | Hartzell, Jr. | 73/497 |
| 4,412,317 | 10/1983 | Asjes et al. | 367/187 X |

Primary Examiner—Reinhard J. Eisenzopf
Attorney, Agent, or Firm—Flehr, Hohbach, Test Albritton & Herbert

[57] ABSTRACT

A passive mass-spring type of sensing device or other such device for monitoring a particular parameter, for example mechanical vibration, is disclosed herein. This device utilizes an electrically conductive coil having a given impedance disposed within a magnetic field in a way which results in relative movement between the coil and the field corresponding to the particular parameter being monitored, whereby to produce a monitoring signal in the form of a voltage which also corresponds to the parameter being monitored. The device includes a circuit arrangement for electronically damping the relative movement recited above in a substantial way while, at the same time, maintaining the monitoring signal at a measurable value.

19 Claims, 5 Drawing Figures

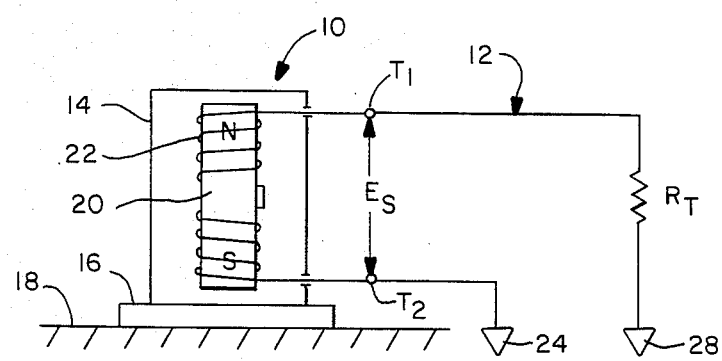
FIG.—1 PRIOR ART
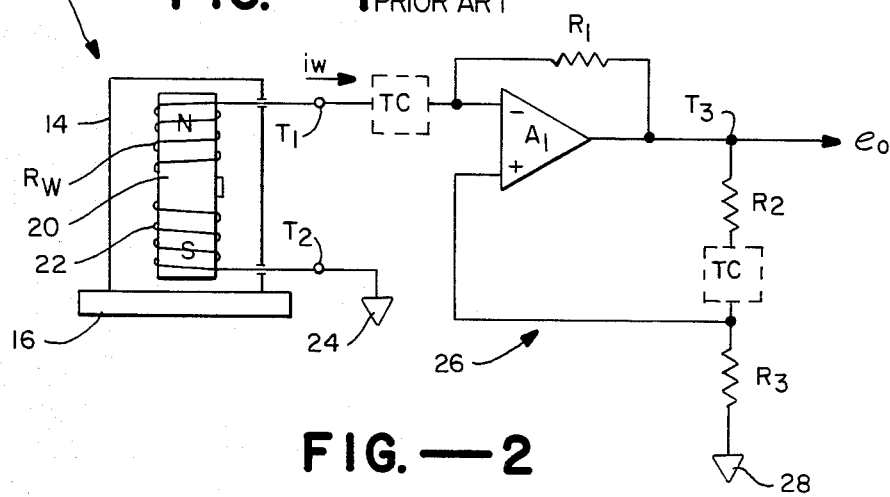
FIG.—2
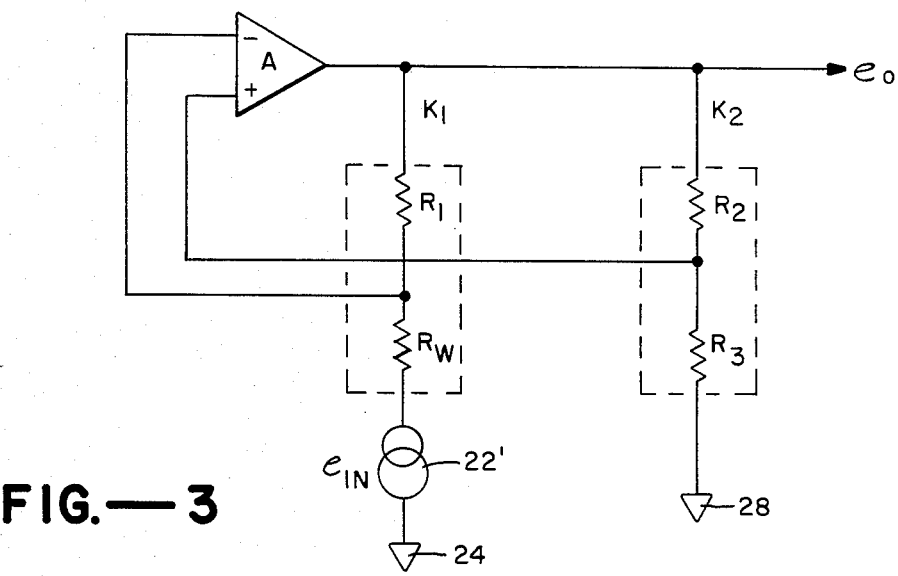
FIG.—3

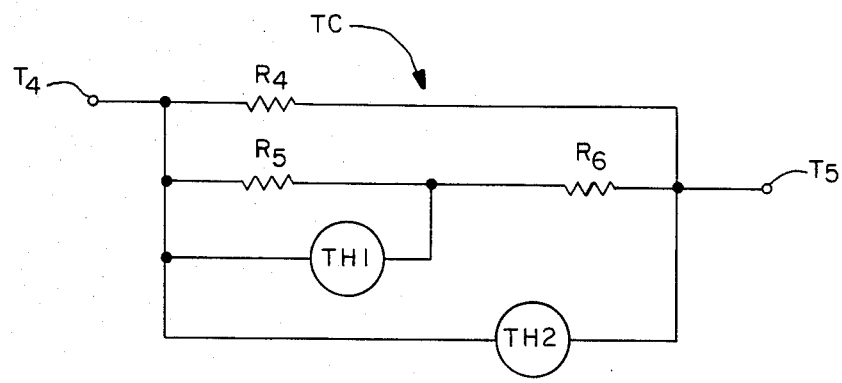
FIG.—4
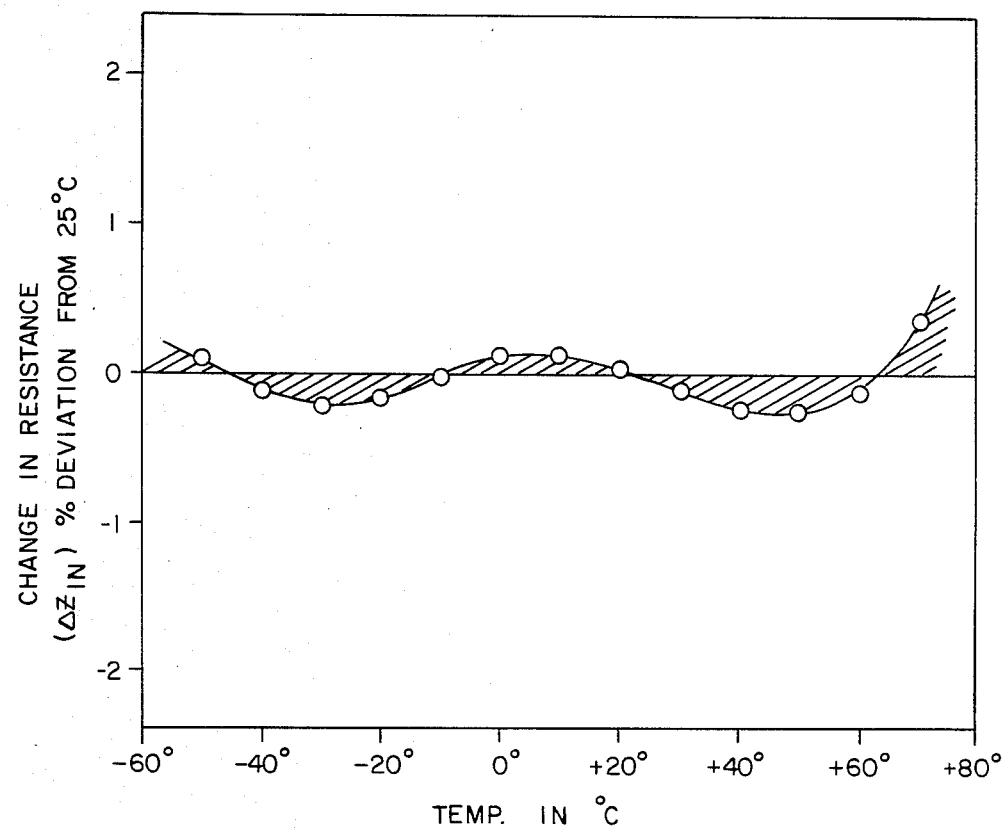
FIG.—5

PASSIVE MASS-SPRING TYPE OF SENSING DEVICE HAVING ELECTRONIC DAMPING

The present invention relates generally to a device, for example a passive mass-spring type of sensing device, utilizing an electrically conductive coil disposed within a magnetic field in a way which results in movement, for example, relative vibratory movement, between the coil and field for monitoring a specific parameter such as mechanical vibration and more particularly to a specific electronic technique for damping the movement to a large extent without adversely affecting the monitoring capabilities of the device itself.

As indicated immediately above, the present invention is directed to a specific electronic means of damping a device of the type recited. A particular example of such a device is disclosed in U.S. Pat. No. 3,633,053 which is directed to a vibration transducer and which is incorporated herein by reference. This transducer includes an outermost casing containing means for producing a magnetic field and an electrically conductive coil having a given impedance disposed within the magnetic field in a way which results in relative vibratory movement between the coil and field corresponding in magnitude and frequency to the particular parameter being monitored, specifically mechanical vibration, whereby to produce a voltage signal (the monitoring signal) which also corresponds in magnitude and frequency to the mechanical vibration being monitored.

In order for a device of the type described in U.S. Pat. No. 3,633,053 to function reliably and accurately, the relative vibratory movement between its coil and magnetic field must be damped in a controlled manner and to a sufficient extent without eliminating or effectively eliminating its monitoring signal. The vibration transducer in U.S. Pat. No. 3,633,053 uses gas damping produced by means of very closely controlled gaps around a moving magnet (which serves to produce the necessary magnetic field) such that the flow of gas through the gaps dissipates energy and thereby produces mechanical damping of the moving mass. While this approach does indeed provide damping in a controlled manner, it does not always provide a sufficient amount of damping, nor is it easily changed in value as requirements change, nor is control of damping over temperature easily effected.

Another damping approach and particularly one which has been suggested to augment gas damping in a device of the type described in U.S. Pat. No. 3,633,053 is illustrated in FIG. 1 forming part of the present specification. This figure diagrammatically depicts the device at 10 in combination with what may be characterized as a shorted-turn type of electronic damping circuit indicated at 12. Device 10 is shown including an outer casing 14 having a support base 16 mounted to the object 18 being monitored for vibration. A permanent magnet 20 is disposed within the casing 14 and mounted for vibratory movement by suitable spring means (not shown). This magnet serves to produce the previously recited magnetic field. At the same time, an electrically conductive coil 22 is located in the casing and within the magnet's field and has opposite ends extending out of the casing so as to define output terminals T1 and T2. As fully described in U.S. Pat. No. 3,633,053, coil 22 which has a given impedance is disposed within the magnetic field produced by magnet 20 in a way which results in relative vibratory movement between the coil and field corresponding in magnitude and frequency to the mechanical vibration being monitored, whereby to produce a voltage signal $E_s$ across terminals T1 and T2. This signal also corresponds in magnitude and frequency to the mechanical vibration being monitored and therefore serves as a monitoring signal. In this regard, it should be noted that in device 10, reciprocity holds with regard to the relative movement between coil 22 and the magnetic field produced by magnet 20. More specifically, it does not matter whether the coil 22 stands still and the magnet moves or the magnet stands still and the coil moves. In each case, the lines of magnet flux will be cut by the coil, thereby resulting in voltage signal $E_s$ at terminals T1 and T2. In addition, it should be noted that the coil 22 is actually comprised of two sections which are oppositely wound to correspond with flux direction such that as the lines of flux are cut, two additive voltages are produced across the coil contributing to the total voltage $E_s$.

As seen in FIG. 1, damping circuit 12 which is grounded at 24 and 28 consists of a resistor $R_t$, connected across terminals T1 and T2, thereby providing a closed circuit consisting of a resistor $R_t$ and coil 22 (through the grounds). As a result, current flows in the circuit, and the force produced by the flowing current through coil 22 opposes the motion of magnet 20, producing the equivalent of viscous damping. To achieve a maximum amount of damping with this circuit, it would be necessary to maximize the magnitude of this current which would require minimizing the total resistance in the circuit. Unfortunately, this loads down the coil and makes the resulting signal $E_s$ smaller and smaller until it is no longer measurable. Hence, there is a real and finite limit to the damping available by this means. Even if it were possible not to lose signal $E_s$ using this approach, for example by some form of amplification, the maximum magnitude of damping current achievable with this circuit would nonetheless be assymptotically limited by the impedance of coil 22. Specifically, even if it were possible to make resistor $R_t$ approach zero without losing the voltage signal $E_s$, the overall circuit would nevertheless include the resistance contributed by coil 22 which would limit the amount of current produced in the circuit and thus limit the maximum damping possible with the given configuration.

Still another disadvantage in the damping approach illustrated in FIG. 1 resides in a fundamental property of the material making up coil 22. This material is typically a pure metal such as copper which changes resistance with temperature at nominally 0.4% per degree Celsius. Thus, over a 100° C. temperature range, the resistance of coil 22 in circuit 12 can change by as much as 40%, thereby changing the amount of damping achieved by a proportionate amount.

The disadvantages just described are applicable to circuit 12 even if used with other types of coil/magnetic field devices requiring damping besides device 10. For example, the relative movement between the coil and field could be rotary, translational or merely transient movement so long as it results in a corresponding current.

In view of the foregoing, it is an object of the present invention to provide an uncomplicated and yet reliable way of electronically damping a passive mass-spring type of sensing device of the general kind described above or other such coil/magnetic field to a greater extent than is possible by means of gas damping alone.

Another object of the present invention is to provide an electronic damping technique of the shorted-turn type described above but one which is not current limited by the resistance of its coil or one which eliminates or substantially eliminates its monitoring signal.

Still another object of the present invention is to provide an electronic damping technique of the shorted-turn type and specifically one which not only achieves the objects recited directly above but which also compensates for changes in resistance in its shorted-turn (e.g. monitoring) coil due to changes in temperature.

As will be seen hereinafter, the present invention is suitable for use in most any kind of passive mass-spring type of sensing device or other such device which includes means for producing a magnetic field and an electrically conductive coil (having a given impedance) disposed within the magnetic field in a way which results in relative movement between the coil and field corresponding in some way, for example in magnitude and frequency, to the particular parameter being monitored by the device, for example mechanical vibration, whereby to produce a monitoring voltage signal which corresponds in the same way to the parameter being monitored. In accordance with the present invention, a circuit arrangement for damping the relative movement between the coil and its surrounding magnetic field is provided in a way which achieves the objectives recited above.

As will be seen hereinafter, the circuit arrangement just recited includes means connected with the coil for providing a closed electrical circuit (including the coil) similar to the circuit illustrated in FIG. 1, whereby to provide a damping current through the coil. However, in accordance with the present invention, the circuit providing means also includes means for maintaining the monitoring voltage signal at a measurable value while, at the same time, reducing the total effective impedance of the closed circuit below the given impedance of the coil itself, whereby to increase the magnitude of the damping current to a greater value than would be possible merely by shorting together the ends of the coil (e.g. limiting the impedance of the circuit to the resistance of the coil, as in the case where $R_t$ is zero). In a preferred embodiment of the present invention, the voltage signal maintaining and impedance reducing means forming part of the circuit includes specific positive feedback amplifier circuitry which not only amplifies the damping current by reducing the total effective impedance of the closed circuit but also amplifies the monitoring voltage signal. This circuitry may also include means compensating for the variation in resistance of the coil with temperature such that the total effective impedance of the circuit does not change with temperature which, in turn, keeps the damping current from varying in the same way.

While the present invention has been described briefly above, it will be described in more detail hereinafter in conjunction with the drawing wherein:

FIG. 1 schematically illustrates the passive mass-spring type of sensing device of the general kind described in U.S. Pat. No. 3,633,053 in combination with a conventional (prior art) electronic damping circuit of the shorted-turn type;

FIG. 2 is a schematic illustration of a sensing device similar to the one illustrated in FIG. 1 in combination with an electronic damping circuit arrangement designed in accordance with the present invention;

FIG. 3 schematically illustrates the circuit arrangement shown in FIG. 2 in a different way;

FIG. 4 is a schematic illustration of a temperature compensative circuit which may be incorporated into the damping circuit arrangement shown in FIGS. 2 and 3; and FIG. 5 is a graphic illustration of how the circuit of FIG. 4 functions.

Inasmuch as the device 10 and circuit arrangement 12 illustrated in FIG. 1 have been described previously, attention is immediately directed to FIG. 2 which illustrates the same passive mass-spring type of sensing device shown in FIG. 1. However, in FIG. 2 sensing device 10 is shown in combination with a circuit arrangement generally indicated at 26 for electronically damping the relative vibratory movement between coil 22 and the magnetic field produced by magnet 20. This circuit arrangement which is designed in accordance with the present invention is connected at its input to terminal $T_1$ on one side of coil 22 and is grounded at 28 while the other side of the coil is grounded at 24 whereby to provide a closed electrical circuit including coil 22 such that the relative movement just recited causes a damping current $i_w$ to be produced in the circuit and to flow through the coil in a way which produces the previously described damping force. At the same time, the circuit arrangement has an output terminal $T_3$ which displays a voltage signal $e_o$ (relative to ground) which corresponds in magnitude and frequency to the relative vibration between coil 22 and its magnetic field whereby to serve as a means for monitoring the vibration and therefore the particular parameter being monitored by the overall device. While not shown, it is to be understood that arrangement 26 includes suitable supply means in circuit with the components shown for powering the overall arrangement.

As will be seen hereinafter, circuit arrangement 26 includes circuitry for amplifying the monitoring voltage signal while, at the same time, reducing the total effective impedance of the closed circuit including coil 22 below the given impedance of the coil. This increases the magnitude of the current to a greater value than would be possible merely by shorting terminal $T_1$ to ground ($T_2$) which corresponds to the embodiment in FIG. 1 where $R_t$ equals zero. This, in turn, increases the magnitude of the damping force in coil 22 to a greater value than would be possible merely by shorting the ends of coil 22 together (for example, through ground).

As illustrated in FIG. 2, circuit arrangement 26 includes an operational amplifier A1 having positive and negative inputs and a single output, and resistors R1, R2 and R3. The negative input to the operational amplifier is connected to terminal $T_1$ and its output is connected to terminal $T_3$ with resistor R1 electrically connected across the two terminals. At the same time, resistors R2 and R3 are connected between terminal $T_3$ ground 28 and the positive input of operational amplifier A1 to provide a positive feedback voltage divider network. Operational amplifier A1 in combination with the three resistors and coil 22 make up a closed electrical circuit between grounds 24 and 28 such that the relative vibratory movement between the coil and its magnetic field as discussed previously result in the production of current $i_w$ which, in turn, serves two purposes. First, it serves to produce the voltage signal $e_o$ at $T_3$ corresponding in magnitude and frequency to the vibration and second it serves to produce the desired damping force opposing the vibratory movement of the coil as it passes through the coil. At the same time and in accordance with the present invention, operational amplifier A1 and the voltage divider network R2, R3 make up positive feedback amplifying circuit for amplifying both the damping current $i_w$ and signal $e_o$ over and above magnitudes achievable by the circuit arrangement illustrated in FIG. 1 where $R_t$ is or approaches zero. Moreover, as will be seen, the components making up this feedback amplifier circuitry can be selected in a way which compensates for changes in the resistance of coil 22 due to temperature.

The way in which circuit arrangement 26 functions in combination with coil 22 is best described by first considering the situation where the resistance R3 equals zero. In this case, the signal sensed by the operational amplifier A1 is derived from coil 22 and the positive input of the operational amplifier remains at zero voltage regardless of output signal $e_o$. Operating as a classical operational amplifier with near-infinite gain, the amplifier A1 will act as a virtual ground to the input signal at its inverting input terminal $T_1$ (e.g. its negative input) causing a maximum amount of current to flow in the transducer winding, exactly as if it were shorted. This by itself then produces what would appear to be the maximum obtainable damping, since this is the equivalent of making $R_t$ equal zero in the circuit illustrated in FIG. 1. In turn, operational amplifier A1 will cause the current $i_w$ to flow through the feedback resistor R1 producing output signal $e_o$ where $e_o$ relative to ground is equal to $-i_w R1$.

The way in which circuit arrangement 26 operates when R3 is zero, as described above, has been suggested as a solution to improved damping heretofore. While this solution is an improvement over the arrangement in FIG. 1 in that output signal $e_o$ is maintained at a measurable value whereas signal $E_s$ in FIG. 1 may not be, due to coil loading, the maximum damping achievable in the FIG. 2 arrangement (when R3 equals zero) is limited by the internal resistance of coil 22 in the same way as the arrangement illustrated in FIG. 1. More specifically, in both cases, the total circuit impedance is not less than the impedance of the coil and thus the damping current is limited by this factor which, in turn, means that coil damping is so limited.

In accordance with the present invention, the resistor R3 is a positive value greater than zero and the combination of this resistor and the value attributed to resistor R2 is such that the two form a positive feedback voltage divider for the operational amplifier. More specifically, by making the value of attenuation of that divider approach the ratio of $R_w/(R_w=R1)$ where $R_w$ is the internal impedance of coil 22, it is possible to amplify signal $e_o$ and current $i_w$ to a level which is not limited by the impedance $R_w$. In other words, the entire circuit including coil 22 and circuit arrangement 26 can be made to have a total effective impedance which is less than the impedance $R_w$ of coil 22 by the appropriate selection of resistors R2 and R3. Moreover, as will be seen hereinafter, this circuit approach can be used to compensate for large changes in coil resistance due to temperature. Heretofore, no such means existed without adding a substantial amount of resistance in series with the winding, further decreasing the actual amount of achieved damping. While it was possible in the past to negate coil resistance change with temperature alone, it was not possible to achieve both control of damping and a high value of damping at the same time.

Referring specifically to FIG. 2, attention is now directed to the way in which the circuitry illustrated there operates. As a positive emf (input voltage) is produced by the previously described relative vibration between coil 22 and the magnetic field produced by magnet 20, current $i_w$ is caused to flow into the junction or terminal $T_1$ of amplifier A1, causing the output of amplifier A1 to go negative. This, through the R2/R3 voltage divider, causes the positive input to operational amplifier A1 to go negative as well. This action causes the output of amplifier A1 (terminal $T_3$) to go further negative, carrying terminal $T_1$ with it to cause its voltage to match that of the positive input to the operational amplifier. The net result of this is to cause an enhanced value of current to flow through the coil $R_w$ and to cause an enhanced amount of damping force to be produced.

For purposes of analysis, the circuitry illustrated in FIG. 2 has been redrawn in FIG. 3, showing $e_{in}$ (22') as the emf produced by the relative vibratory movement between coil 22 and its magnetic field 20, and $R_1$, $R_w$ and $R_2$, $R_3$ as two independent voltage dividers. For purposes of description, the coefficients $k_1$ and $k_2$ will be utilized where:

$$k_1 = \frac{R_w}{R_w + R1}$$

$$k_2 = \frac{R3}{R2 + R3}$$

An analysis of the overall circuit illustrated in FIG. 3 indicates that the signal output $e_o$ can be related to its input $e_{in}$ by the following equation:

$$\frac{e_o}{e_{in}} = \frac{-(1 - k_1)}{k_1 - k_2} = \text{V.G. (Voltage Gain)} \qquad \text{EQ. 1.0}$$

Further, the effective input impedance to the overall circuit $Z_{in}$ can be computed by the following equation:

$$Z_{in} = \frac{R_w + R_1}{1 - \text{V.G.}} \qquad \text{EQ. 2.0}$$

From these two equations immediately above, the effects of and usefulness of the present invention can be more fully understood. First, it should be noted that the damping force produced by this "shorted-turn" type of damping represents a force opposing motion which has a magnitude proportional to the instantaneous velocity, going to zero at zero velocity. The force is produced by the interaction of the current flowing in the coil 22 with a field produced by magnet 20. Since the current flowing is that produced by the instantaneous emf caused by the relative vibratory movement between the coil and its magnetic field, the current is proportional to the velocity of this relative movement and the force produced by the interaction is both in opposition to the motion and directly proportional to the instantaneous velocity. In the case of the shorted winding, the current is directly determined by the ratio of the emf to the winding resistance. Thus, if that resistance can be reduced the current could be increased, and along with it the damping force would increase proportionally, as discussed above.

The present invention acts directly to lower the apparent resistance (or impedance) of the coil through the use of positive feedback, represented by the $R_2$, $R_3$ divider feeding back to the positive input of the operational amplifier. By inspection, it is obvious that as the value of $k_2$ in the denominator of Equation 1.0 above approaches the value of $k_1$, the voltage gain of the circuit will approach infinity. Of course, it should be clear that $k_2$ can never actually equal or exceed $k_1$ in a practical embodiment. Further, by inspection of Equation 2.0, that same term, that is, voltage gain, appears in the denominator, showing that as $k_2$ increases, approaching $k_1$, the input impedance $Z_{in}$ will approach zero. The current which will flow in the winding is:

$$i_w = \frac{emf}{Z_{in}}$$

Obviously, since $Z_{in}$ can approach zero, the input current can be greatly magnified, producing a like increase in the magnitude of the damping force produced. In any event, by the judicious selection of R2 and R3 (after R1 has been selected and $R_w$ has been determined), the total impedance $Z_{in}$ can be made to be less than resistance $R_w$ and therefore current $i_w$ can be made to be greater than it would otherwise be in the FIG. 1 circuit arrangement or in the present arrangement if R3 were made to be zero.

As a quantitative example, consider the following design of transducer, one with a moving magnet and fixed winding, with the primary damping produced by the current flowing in the winding due to the "shorted-turn" principle of damping. Following are the constants of a typical design:
Magnet mass: 10 gm
Mechanical Spring Stiffness: 100,000 dynes/centimeter
Winding: 1000 turns, each turn 3.14 cm in length, 100 ohms total resistance
Magnetic Field: 2000 gauss.

From these constants, the following characteristics can be computed; using conventional equations describing a second order mass-spring system:
Natural Frequency: 100 radians/second (15.9 Hz)
$c_c$=Damping constant for critical damping: 2000 dynes/cm/second.

The effect of the shorted-turn damping can be computed by computing the emf produced by a 1 cm/sec velocity, dividing it by the winding resistance, and then multiplying by the motor constant of the winding:

$$emf = B \cdot 1 \cdot N \cdot 10^{-8} = 2000 \cdot 3.14 \cdot 1000 \cdot 10^{-8}$$

$$emf = 0.0628 \text{ VDC/cm/sec}$$

$$i_w = emf/R_w = 0.0628/100 = 0.628 \cdot 10^{-3} \text{ amperes}$$

$$\text{Damping Constant} = i_w(B \cdot 1 \cdot N \cdot 10^{-1}) \text{ dynes/cm/sec}$$

$c = 394$ dynes/cm/sec (produced by the shorted winding)

From this, the actual damping ratio achieved for the design is computed by dividing actual c by $c_c$ or 394/2000=0.0197. This indicates that the transducer described above would be significantly underdamped utilizing all of the damping force available by use of the "shorted turn" damping. This design can be markedly improved by use of the invention disclosed herein.

Specifically, assume the circuit to be as shown in FIG. 3, with the following values of constants:
$R_w$=100 ohms
R1=1000 ohms
R2, R3 chosen to provide specific values of $k_2$.

From Equations 1.0 and 2.0, the following relationships can be determined for various values of $k_2$ in terms of $k_1$ as set forth in Table I below.

TABLE I

| $k_2$ | Voltage Gain v/v | Effect. $Z_{in}$ | Damping Achieved Relative | Damping Achieved Actual |
|---|---|---|---|---|
| 0.00 $k_1$ | 10.00 | 100 Ω | 1.000 | 0.197 |
| 0.50 $k_1$ | 20.00 | 52.38 | 1.909 | 0.376 |
| 0.667 $k_1$ | 30.00 | 35.48 | 2.818 | 0.555 |
| 0.800 $k_1$ | 50.00 | 21.57 | 4.636 | 0.913 |
| 0.900 $k_1$ | 100.00 | 10.89 | 9.182 | 1.811 |
| 0.950 $k_1$ | 200.00 | 5.47 | 18.272 | 3.605 |
| 0.980 $k_1$ | 500.00 | 2.20 | 45.537 | 8.963 |
| 0.990 $k_1$ | 1000.00 | 1.10 | 90.992 | 17.927 |

The above table clearly illustrates the great magnification of voltage gain and damping possible by use of the disclosed invention; as a practical example, selecting $k_2=0.667\ k_1$ would yield an actual damping ratio of 0.555, a very acceptable damping for the described transducer. Further, it is obvious to one of ordinary skill in the art that the characteristics of both gain and damping can be easily modified by changes in either R2 or R3.

Since, as described earlier, the resistance $R_w$ of the winding is a function of temperature and would make both voltage gain and damping vary by up to 40% or more without use of this invention, it is further clear that by making as an example either R2 or R3 a function of temperature, the effects of the changing value of $R_w$ can be substantially cancelled through use of this invention. In other words, the overall circuit including resistance $R_w$ can be made to have an effective impedance which does not vary with temperature.

While temperature compensation can be achieved by the appropriate selection of R2 and/or R3, it can also be achieved by the circuit generally indicated at TC in FIG. 4. This circuit which is comprised of the combination of resistors R4, R5 and R6 and negative T.C. thermistors TH1 and TH2 shown is placed in series with resistor R2 or terminal $T_1$ as indicated by dotted lines in FIG. 3. The two thermistors vary rapidly in resistance with temperature, falling in value with increasing temperature. At the same time, resistors R4, R5 and R6 are selected such that the total effective impedance of the overall circuit including circuit TC, coil 22 and arrangement 26 is a fixed value regardless of variations in resistance of the coil with temperature. This is best exemplified in FIG. 5 which shows that the change in impedance of the overall circuit (e.g., $\Delta Z_{in}$) is less than one-half of 1% throughout a temperature range of $-60°$ C. to $+60°$ C. This shall be contrasted with changes in resistance of the coil ($R_w$) which can be as much as 50%. In this particular example, $R_w=950\Omega$, R4=800Ω, R5=7KΩ and R6=1.2KΩ. Also, TH1=100Ω and TH2=1KΩ. The net resistance of circuit TC is 331.1Ω ($R_{TC}$) and the combined resistance of $R_w$ and $R_{TC}$ is 1281.1Ω at 25° C. Circuit arrangement 26 lowers the effective impedance of the overall circuit (e.g. $Z_{in}$) to a value below 950Ω ($R_w$) from 1281.1Ω and this lower value is maintained substantially constant by means of circuit TC.

As indicated above, circuit TC can be placed in circuit 26 in series with resistor R3 or in series with terminal $T_1$. When placed in the former location, circuit TC will maintain $Z_{in}$ constant or, it could be used to stabilize voltage gain (V.G.) of arrangement 26 with temperature but not both, as is apparent from inspecting equations 1 and 2 above. On the other hand, when circuit TC is placed in series with terminal $T_1$ it combines with coil 22 to provide a constant resistance (regardless of temperature changes) at the input of circuit arrangement 26. In other words, this latter arrangement sees a constant resistance at its input regardless of changes in $R_w$. As a result, both $Z_{in}$ and V.G. are maintained constant with changes in $R_w$. This of course assumes that all of the components making up circuit arrangement 26 are stable and thus do not vary in resistance (or impedance generally) with temperature.

It is to be understood that the actual quantitative embodiment recited above is provided for exemplary purposes only and is not intended to limit the present invention. Obviously, the values of $k_1$ and $k_2$ may vary with specific sensing devices. Moreover, other circuit arrangements may be possible, again depending upon the overall sensor, to reduce the total effective circuit impedance below the impedance of the sensing coil itself. In this latter regard, it is to be understood that the invention embodied in circuit arrangement 26 is not limited to use with device 10. Arrangement 26 could be used in the manner described above with other coil/magnetic field devices so long as the latter provides the necessary relative movement to produce a current which corresponds in some way to the movement and which also serves to dampen the movement. This movement can be in the nature of oscillation (e.g., vibration), rotary movement, translational movement or the like including for example, the transients referred to above.

What is claimed is:

1. In a device including means for producing a magnetic field and a single electrically conductive coil having a given impedance disposed within said magnetic field in a way which results in relative movement between the coil and field corresponding to a particular parameter being monitored whereby to produce a voltage signal which also corresponds to said parameter, a circuit arrangement for damping said relative movement, comprising means connected with said coil for providing a closed electrical circuit including the coil such that the relative velocity between the coil and field as a result of said movement causes a current to be produced in said circuit including said single coil and to flow through said single coil in a way which produces a force, proportionate in magnitude to said current, opposing said movement whereby to dampen said movement, said circuit providing means also including mean for maintaining said voltage signal at a measurable value while, at the same time, reducing the total effective impedance of said closed circuit including said single coil below the given impedance of said coil whereby to increase the magnitude of said current and therefore its associated damping force to a greater value than would be possible merely by shorting together the ends of the coil.

2. In a sensing device according to claim 1 wherein said electrically conductive coil is configured such that its given impedance varies with temperature and wherein said circuit arrangement includes means compensating for this temperature induced variation so that said damping current does not substantially vary as a result of variations in the coil's impedance with temperature.

3. In a sensing device according to claim 2 wherein said temperature compensating means includes a circuit means electrically connected in said closed circuit with said coil such that the total effective impedance of said closed circuit remains substantially constant regardless of changes in the resistance of said coil with temperature.

4. In a sensing device according to claim 3 wherein said voltage signal maintaining and impedance reducing means includes signal amplifying circuitry have voltage gain and wherein said circuit means is connected in said closed circuit such that the voltage gain of said signal amplifying circuitry remains substantially constant regardless of changes in resistance of said coil with temperature.

5. In a sensing device according to claim 1 wherein said voltage signal maintaining and impedance reducing means includes circuitry forming part of said closed circuit for amplifying both said voltage signal and said damping current.

6. In a sensing device according to claim 5 wherein said amplifying circuitry includes a positive feedback amplifier.

7. In a sensing device according to claim 6 wherein said positive feedback amplifier includes first resistor means through which said damping current is caused to pass for producing said voltage signal.

8. In a sensing device according to claim 7 wherein said amplifier includes second resistor means which serves to make said amplifier a positive feedback amplifier, said first and second resistor means being selected so as to reduce the total effective impedance of said closed circuit below the given impedance of said coil.

9. In a sensing device according to claim 8 wherein said positive feedback amplifier includes an operational amplifier having positive and negative inputs and an output, wherein said coil is connected in said circuit such that its given impedance is connected between ground and the negative input of said device and said first resistor means is a first resistor connected across said negative input and the output of said device and wherein said second resistor means includes a second resistor connected across the positive input of said device and said output and a third resistor connected between said positive input and ground such that $$k_1 = \frac{R_w}{R_w + R1}$$

$$k_2 = \frac{R3}{R2 + R3}$$

$$\frac{e_o}{e_{in}} = \frac{-(1 - k_1)}{k_1 - k_2} = VG$$

$$Z_{in} = \frac{R_w + R1}{1 - VG}$$

where $R_w$ is the given impedance of said coil, R1, R2 and R3 are said first, second and third resistors, respectively, $e_i$ is the input voltage to said circuit, $e_o$ is the output voltage to said circuit, VG is the voltage gain of the circuit and $Z_{in}$ is the effective input impedance.

10. In a sensing device according to claim 9 wherein said resistors R1, R2 and R3 are selected such that $k_2$ is a positive value less than $k_1$ but sufficiently large to make $Z_{in}$ less than $R_w$.

11. In a sensing device according to claim 9 wherein said electrically conductive coil is configured such that its given impedance $R_w$ varies with temperature, where said circuit arrangement includes means compensating for this temperature-induced variation so that said damping current does not substantially vary as a result of variations in $R_w$ with temperature.

12. In a sensing device according to claim 11 wherein said second resistor and/or third resistor is of the type which varies in resistance with temperature in a way which allows it to serve as said compensating means.

13. In a sensing device according to claim 11 wherein said compensating means includes a thermistor network electrically in said closed circuit along with said amplifying circuitry and said coil for maintaining $Z_{in}$ constant regardless of changes in $R_w$ due to variations in temperature.

14. In a sensing device according to claim 13 wherein said amplifying circuitry includes voltage gain and wherein said thermistor network is located in said closed circuit so that said voltage gain remains constant regardless of changes in $R_w$ due to variations in temperature.

15. A device for monitoring a particular parameter such as mechanical vibration, said device comprising: means for producing a magnetic field; a single electrically conductive coil having a given impedance, said coil being disposed within said magnetic field in a way which results in relative movement between the coil and field corresponding to the particular parameter being monitored; means cooperating with said coil and responsive to said relative movement for producing a voltage signal which also corresponds to said parameter; and means including said single coil and voltage signal producing means forming a closed electrical circuit having a total effective impedance below the given impedance of said coil, said circuit being configured such that said relative movement between the coil and said magnetic field causes a current to be produced in said circuit and to flow through said single coil in a way which produces a force, proportionate in magnitude to said current, opposing said movement, whereby to dampen said movement.

16. A device according to claim 15 wherein said electrically conductive coil is configured such that its given impedance varies with temperature and wherein said circuit forming means includes means compensating for this temperature induced variation so that the total effective impedance of the overall circuit does not substantially vary with changes in the coil's impedance due to temperature.

17. In a device including means for producing a magnetic field and a single electrically conductive coil having a given impedance disposed within said magnetic field in a way which results in relative movement between the coil and field corresponding to the particular parameter being monitored whereby to produce a voltage signal which also corresponds to said parameter, a method of damping said relative movement, said method comprising the steps of: providing a closed electrical circuit including said single coil such that said relative vibratory movement causes a current to be produced in said circuit and to flow through said single coil in a way which produces a force, proportionate in magnitude to said current, opposing said vibratory movement, whereby to dampen said movement; and maintaining said voltage signal at a measurable value while, at the same time, reducing the total effective impedance of said closed circuit below the given impedance of said coil whereby to increase the magnitude of said current and therefore said damping force to a greater value than would be possible merely by shorting the terminals of the coil.

18. A method according to claim 17 wherein said electrically conductive coil is configured such that its given impedance varies with temperature, said method including the step of compensating for this temperature variation so that the total effective impedance of said closed circuit remains constant regardless of temperature induced variations in the impedance of said coil.

19. A method according to claim 18 wherein both said damping current and said voltage signal are amplified by amplifying means displaying voltage gain and wherein said temperature compensating step maintains said voltage gain constant regardless of temperature-induced variations in the impedance of said coil.

* * * * *